Dec. 31, 1957  J. D. THORNTON  2,818,324
LIQUID-LIQUID EXTRACTION COLUMNS
Filed June 25, 1954  3 Sheets-Sheet 1

Inventor
THORNTON, JOHN DESMOND;

By Robert B Pearson

Attorney

Dec. 31, 1957  J. D. THORNTON  2,818,324
LIQUID-LIQUID EXTRACTION COLUMNS
Filed June 25, 1954  3 Sheets-Sheet 2

Inventor
THORNTON, JOHN DESMOND;
By
Attorney

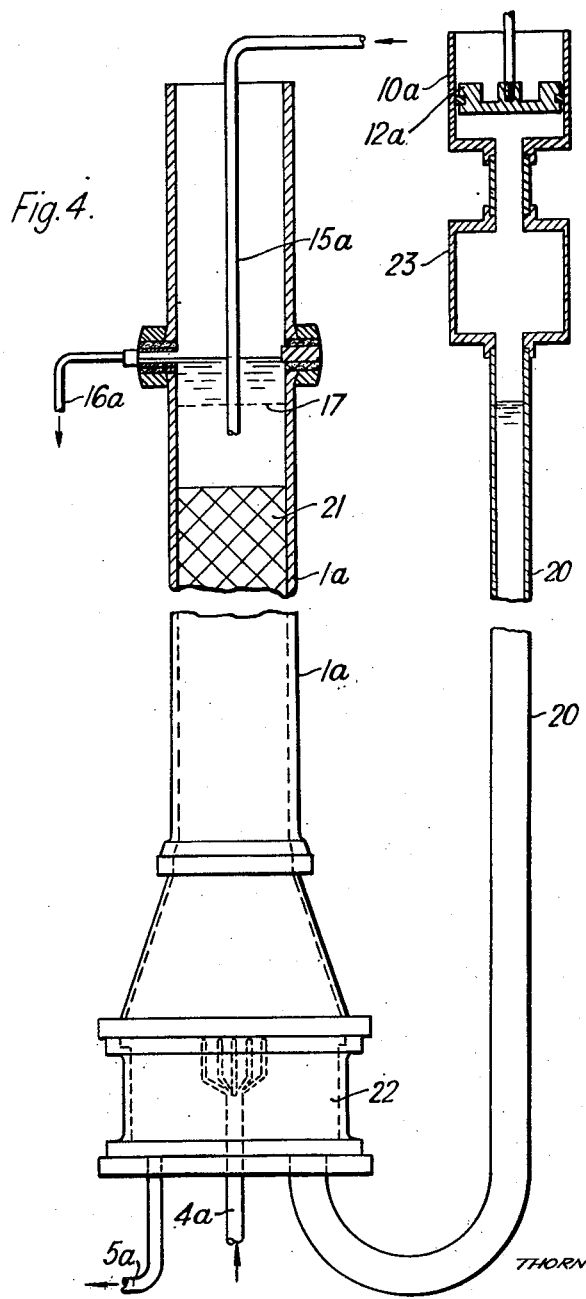

United States Patent Office 2,818,324
Patented Dec. 31, 1957

2,818,324

LIQUID-LIQUID EXTRACTION COLUMNS

John Desmond Thornton, Abingdon, England, assignor, by mesne assignments, to the United States of America as represented by the United States Atomic Energy Commission Application June 25, 1954, Serial No. 439,440

5 Claims. (Cl. 23—270.5)

This invention relates to liquid-liquid extraction columns having means for pulsing the liquids in the column so that they are given, in addition to their normal movement through the column, an oscillatory movement up and down the column. Such columns are known as "pulsed columns."

It has been proposed to carry out the pulsing in a column by means of an oscillating diaphragm, bellows or piston in contact with the liquid either in one of the feed lines to the column or in the wall or base of the column.

In accordance with the invention, a pulse column is provided with means for pulsing the column via a gas in contact with the liquid in the column. The gas is preferably pulsed by a piston. Alternatively pulsing of the gas may be carried out via a bellows or by the injection and escape of pulses of compressed gas. The gas is required to be substantially inert to the process liquid and may be air if air fulfils this condition.

In one form of the invention a packed column is provided with a duct having one end coupling with the liquids near the base of the column and having the other end above the level of liquid in the column, and a piston for pulsing gas above the liquid in the duct.

In a preferred form of the invention the duct coupling with the liquids near the base of the column comprises a tube coaxial with the column and dipping into the liquid in the column. In an alternative form the tube lies outside the column and is connected through the wall of the column near the base of the column or through the base of the column.

The packing means in the column is preferably a fixed regular packing, such as a series of sieve plates, rather than a random packing. In certain circumstances it is observed that a random packing, such as Raschig rings, tends to become orientated in one direction with the pulsing so that the efficiency of the packing falls away.

The column of the invention possesses the advantages that process liquors in the column do not come in contact with moving parts so that no wear or corrosion can occur on the moving parts due to contact with these liquors; that any failure of the pulsing mechanism does not allow the process liquors to escape from the column; and that maintenance of the column pulsing mechanism is simplified.

Embodiment of the invention will now be described by way of example with reference to the accompanying drawings wherein.

Figure 1:
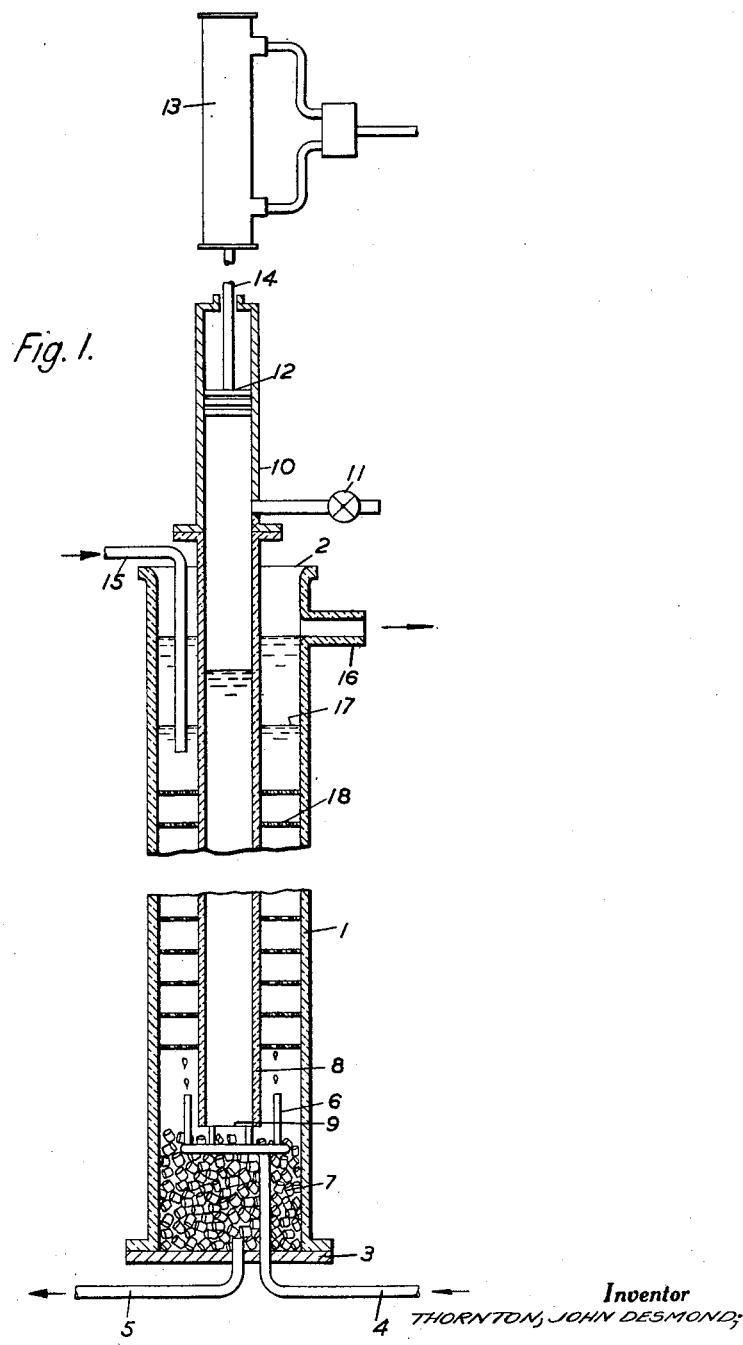
Fig. 1 is a schematic vertical section of the coaxial dip-tube form of the invention.

The column shown in Fig. 1 comprises a glass tube 1 having an open end 2 and a closed end 3. Passing through the closed end 3 there is a dispersed phase inlet pipe 4 and a continuous phase outlet pipe 5. The pipe 4 terminates in a series of nozzles 6. The closed end 3 of the column may contain carbon rings 7 when working with hydrocarbon systems of low interfacial tension in order to overcome the tendency for very small solvent droplets to be entrained in the continuous phase outlet 5. The carbon rings 7 are preferentially wetted by the dispersed phase and coalescence and subsequent detrainment of the droplets is thereby promoted. A dip-tube 8 having an open end 9 connecting with the liquid in the base of the column 1 is supported coaxially within the column 1. The tube 8 is flange connected with a cylinder 10 having an air inlet pipe and valve 11 and a piston 12. The piston 12 is reciprocated by an air motor 13 via a connecting rod 14. A continuous phase inlet pipe 15 is provided and the dispersed phase passes from the column through outlet duct 16. The interface between the two phases is indicated by line 17. Sieve plates 18 are fixed in the column.

The top of the column is shown to be open but it may be closed so long as a small vent is provided to prevent excessive build-up of pressure above the liquid with consequent undue damping of the oscillations. In a modification a double-acting effect is obtained by connecting the vent of an otherwise closed column by means of a pipe to the cylinder above the piston. By this means, on the up-stroke of the piston, pressure is applied to the surface of the liquid in the column (outside the dip-tube 8) so as to assist in the return of the liquid to a lower level subsequent to its displacement.

In our arrangement constructed as shown in Fig. 1 the column 1 is made from 3 in. diam. precision bore borosilicate glass and the dip tube 8 is a 1½ in. metal tube with the sieve plates tightly fitting and spaced at ¾ in. intervals by sleeves which are a sliding fit on the tube. The sieve plates are drilled with ⅛ in. diam. holes based on a triangular pitch to give a total free area of 25%.

The speed and stroke of the air motor 13 is preferably made adjustable.

In the arrangement shown the maximum volume swept by the piston is .009 cubic ft. and the gas pocket above the liquid is approx. .038 cubic ft.

Figure 2:
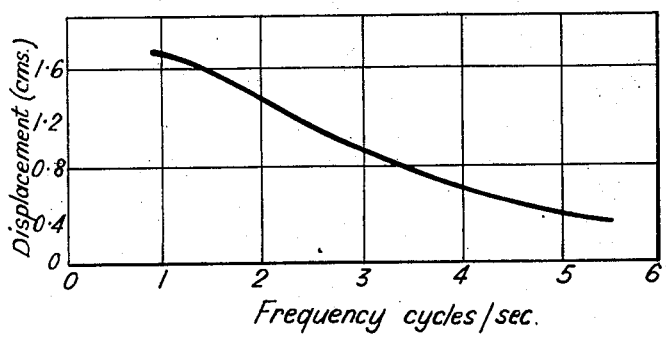
Figs. 2 and 3 are graphs depicting some of the characteristics of the embodiment shown in Fig. 1 and, Fig. 4 is a view similar to Fig. 1 but partly in elevation showing an external pulsing tube form of this invention.

Unlike those columns known in the art in which the pulse is transmitted directly from a pulsing means to the process fluid, the fluid in a column of the invention cannot cavitate since the maximum displacement of the fluid adjusts itself automatically to the imposed frequency. A typical curve relating maximum displacement and frequency for a column of the above dimensions is shown in Fig. 2.

In practice, however, the two variables, displacement and frequency are made independent by ensuring that the pulsing unit is large enough to give the desired amplitude at the highest operating frequency desired and controlling the amplitude at lower frequencies by reducing the stroke of the piston.

Figure 3:
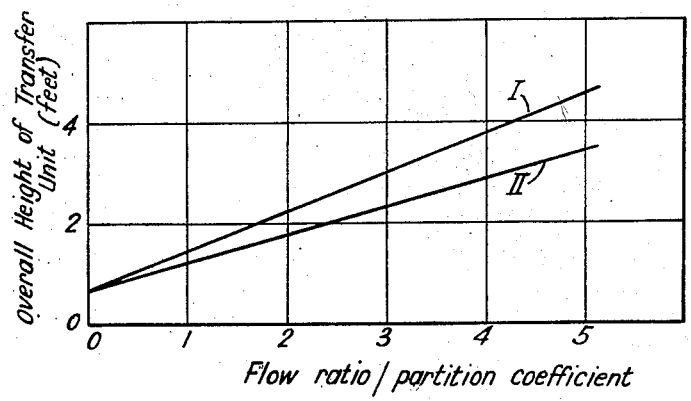

The efficiency of extraction for a system in which the continuous phase is water and the dispersed phase is toluene plus 5% acetone is plotted in Fig. 3 in terms of the overall height of a transfer unit against the flow ratio (velocity of continuous phase/velocity of dispersed phase) divided by the partition coefficient. Curve I is for a pulse frequency of 2 C. P. S. and a liquid displacement of 0.48 cms. Whereas curve II is for a pulse frequency of 1.5 C. P. S. and a liquid displacement of 1.27 cms.

A form of this invention in which a pulse tube 20 is arranged externally of the column 1a is shown in Fig. 4. The particular column illustrated is 6 in. diam. and 25 ft. high and the pulse tube 20 is 2 in. diam. A fixed regular packing 21 is arranged within the column which in this instance has an enlarged lower end 22. Connections for the dispersed phase inlet and outlet are shown at 4a and 16a respectively and connections for the continuous phase inlet and outlet are shown at 15a and 5a respectively. A cylinder 10a and piston 12a are arranged at the upper end of the tube 20 above the level of the liquid therein and means not shown in this figure but which may be an air motor as indicated at 13 in Fig. 1 are provided for reciprocating the piston.

Because of the relatively larger volume of liquid displaced per pulse in the tube 20 (compared with the tube 8 in Fig. 1), an expansion chamber 23 is arranged below the cylinder 10a and immediately above the free liquid surface in the column 1a. The expansion chamber 23 serves to reduce the vertical movement of the liquid in the upper part of the tube 20 and prevents it entering the cylinder 10a.

As stated above the invention possesses inter alia the advantage that the process liquors do not come into contact with moving parts. A fine spray or unit from the liquors may, however, form in the gas pocket and if this is undesirable means may be provided for continuously purging the gas pocket as by means of an inert gas supply controlled by a valve 11 (Fig. 1) combined with a bleed pipe (not shown) for drawing off the mist laden gas to a container where it is harmless or can be suitably dealt with.

What I claim is:

1. A liquid-liquid extraction column comprising a packed column, an inlet pipe for the dispersed liquid phase and an outlet pipe for the continuous liquid phase located in direct communication with the liquid in the lower part of said column, an inlet pipe for the continuous liquid phase and an outlet pipe for the dispersed liquid phase located in direct communication with the liquid in the upper part of said column, a tube having one end communicating with liquid in the lower part of said column and having its upper end located above the level of said outlet pipe for the dispersed phase, and a piston and cylinder connected to the upper end of said tube for applying a pulsating pneumatic pressure to the surface of the liquid in said tube so that said surface rises and falls in said tube.

2. A liquid-liquid extraction column as claimed in claim 1 wherein said tube depends coaxially into the column.

3. A liquid-liquid extraction column as claimed in claim 2 wherein the tube is fitted externally with annular sieve plates which constitute a packing for the column.

4. A liquid-liquid extraction column as claimed in claim 1 wherein said tube is arranged externally of the column.

5. A liquid-liquid extraction column as claimed in claim 4 wherein said tube comprises a return bend and communicates with the lower part of the column through the bottom end thereof.

References Cited in the file of this patent

UNITED STATES PATENTS

| | | |
|---|---|---|
| 1,509,686 | Morterud | Sept. 23, 1924 |
| 1,740,105 | Lake | Dec. 17, 1929 |
| 1,780,853 | Walsh | Nov. 4, 1930 |
| 2,183,837 | Hamilton et al. | Dec. 19, 1939 |
| 2,364,892 | Elgin | Dec. 12, 1944 |

FOREIGN PATENTS

| | | |
|---|---|---|
| 513,747 | France | Feb. 22, 1921 |